United States Patent [19]

Franchina

[11] 4,202,493
[45] * May 13, 1980

[54] HEATING SYSTEM HAVING SOLAR ASSIST

[76] Inventor: Antonino Franchina, 5219 Botsford St., Sterling Heights, Mich. 48077

[*] Notice: The portion of the term of this patent subsequent to Feb. 27, 1996, has been disclaimed.

[21] Appl. No.: 968,437

[22] Filed: Dec. 11, 1978

Related U.S. Application Data

[63] Continuation-in-part of Ser. No. 871,493, Jan. 23, 1978, Pat. No. 4,141,490.

[51] Int. Cl.² ............................................. G05D 23/00
[52] U.S. Cl. ....................................... 237/2 B; 62/238; 62/324; 165/DIG. 2; 126/110 R
[58] Field of Search ................... 126/270, 400, 110 R; 62/2, 324 D, 238 E; 237/1 A, 2 B, 55; 165/DIG. 2

[56] References Cited

U.S. PATENT DOCUMENTS

| | | | |
|---|---|---|---|
| 1,969,187 | 8/1934 | Schutt | 237/1 A |
| 2,396,338 | 3/1946 | Newton | 62/2 |
| 2,562,748 | 7/1951 | Smith et al. | 62/324 D |
| 2,723,083 | 11/1955 | Bary | 237/2 B |
| 2,827,893 | 3/1958 | Ribando et al. | 237/19 |
| 3,777,508 | 12/1973 | Imabayashi et al. | 62/324 D |
| 3,844,233 | 10/1974 | Fishback | 122/20 B |
| 3,902,474 | 9/1975 | Pyle | 237/1 A |
| 3,980,071 | 9/1976 | Barker, Jr. | 237/1 A |
| 3,996,998 | 12/1976 | Garst et al. | 165/12 |
| 4,006,856 | 2/1977 | Nilsson | 237/1 A |
| 4,012,920 | 3/1977 | Kirschbaum | 237/2 B |
| 4,049,194 | 9/1977 | Tice et al. | 237/1 A |
| 4,111,259 | 9/1978 | Lebduska | 62/2 |
| 4,141,490 | 2/1979 | Franchina | 237/2 B |
| 4,146,013 | 3/1979 | Foulke | 62/2 |
| 4,151,721 | 5/1979 | Kumm | 62/2 |

*Primary Examiner*—Henry C. Yuen
*Attorney, Agent, or Firm*—Basile and Weintraub

[57] ABSTRACT

A heating system for a building having a conventional gas furnace which includes a combustion chamber for heating air passing from a cold-air return to a hot-air duct is disclosed. The gas furnace includes an exhaust stack for exhausting hot gases from the combustion chamber externally of the building. The heating system includes a heat pump comprising a housing having a condenser for heated air passing thereby from the cold-air return to the hot-air duct. The heat pump also includes an evaporator located externally of the building for drawing heat from the atmosphere. The heating system includes a conduit connecting the exhaust stack to the evaporator such that exhaust gases from the gas furnace combustion chamber will be directed pass the evaporator for permitting the recapture of stack heat for heating the building. The heating system includes a solar panel for heating air passed therethrough and a circuit for using the solar warmed air to warm the ambient air at the evaporator. A heat storage chamber is provided wherein air warmed by the solar panel may be stored for future use when the amount of solar warm air available exceeds the amount needed for heating the building.

8 Claims, 1 Drawing Figure

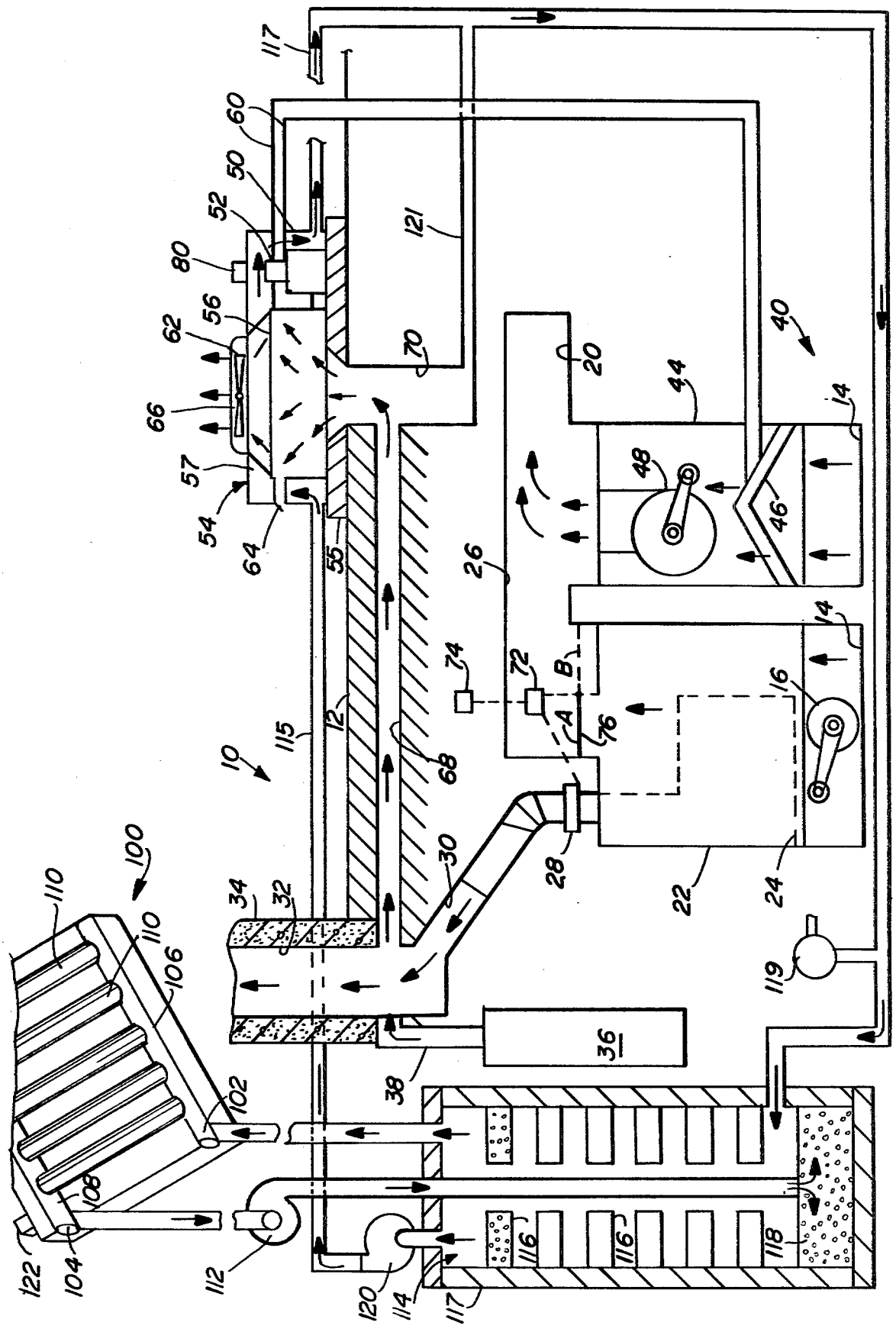

HEATING SYSTEM HAVING SOLAR ASSIST

CROSS REFERENCE TO RELATED APPLICATIONS

This application is a continuation in part of copending application Ser. No. 871,493 filed Jan. 23, 1978 and now U.S. Pat. No. 4,141,490 entitled "HEATING SYSTEM", the disclosure of which is incorporated by reference.

BACKGROUND OF THE INVENTION

I. Field of the Invention

The present invention generally relates to heating devices and, in particular, the present invention is concerned with a heating system having a combined gas furnace and heat pump including a solar panel for providing heat to a building in an economical manner.

II. Description of the Prior Art

In recent years there has been a deep concern by the public for the high cost of energy and, in particular, the cost of providing heat to homes, office buildings, and the like. A variety of methods have been proposed for drawing heat from the atmosphere, and heap pump cooling and air conditioning systems have been suggested as a solution. Such heat pump reversing or conversion systems have not yet met with full acceptance with the public in that they merely offer a different manner of heating rather than fulfilling their potentional as an additional heat source to be combined with heat generating systems of different types. Examples of heat pump conversion systems in the prior art are disclosed in U.S. Pat. Nos. 3,993,121; 3,996,998; 3,935,899; 3,777,508; 2,677,243; 3,844,223; and 4,050,628. These patents are relevant to applicant's invention in that they represent the closest prior art for utilizing heat pumps in conjunction with furnace systems to maximize the efficiency of obtaining heat for homes, office buildings and the like.

Prior Art Statement

The aforementioned prior art, including the applicant's copending application, in the opinion of the applicant and applicant's attorney, represents the closest prior art of which applicant and applicant's attorney are aware.

SUMMARY OF THE INVENTION

The present invention, which will be described in greater detail hereinafter, comprises a heating system for heating homes, office buildings and the like comprising a gas furnace connected between a cold-air return and a hot-air duct. The gas furnace includes a combustion chamber for heating air passing thereby from the cold-air return to the hot-air duct. An exhaust stack associated with the gas furnace exhausts the hot gases from the combustion chamber. The system has a heat pump comprising a condenser having an inlet communicating with the cold-air return and an outlet communicating with the hot-air duct. The heat pump has an evaporator located externally of the building for drawing heat from the atmosphere and communicating the same to the condenser to heat the air passing thereby. A first conduit communicates the hot exhaust gases from the exhaust stack past the evaporator to provide a simple and efficient means for reclaiming heat lost from the gas furnace. A solar panel is provided which is directed at the sun to warm air passing therethrough. The solar warmed air is directed past the evaporator by a second conduit to use solar heat to augment the gas heat.

It is therefore a primary object of the present invention to provide a new and improved heating system.

It is a further object of the present invention to provide such a heating system which combines a gas furnace and a heat pump to provide an efficient system for heating and cooling the air within a building.

It is yet another object of the present invention to provide a solar panel to improve the heat obsorption of the heat pump evaporator and improve the furnace efficiency.

It is a further object of the present invention to provide a heat storage chamber to store solar heat during periods when there is more solar energy available than needed and to give up the stored solar heat during periods of low solar heat availability.

It is another object of the present invention to provide a heating system combining a gas furnace and a heat pump wherein the heat pump reversibly functions to heat and cool the supply of air delivered to the heating system.

It is yet a further object of the present invention to provide a combination heating system having a furnace and heat pump arrangement which results in substantial fuel savings as compared with conventional heating systems.

It is yet another object of the present invention to provide an improved heating system which may be readily and inexpensively installed.

Further objects, advantages, and applications of the present invention will become apparent to those skilled in the art of heating systems when the accompanying description of one example of the best mode contemplated for practicing the invention is read in conjunction with the accompanying drawing.

BRIEF DESCRIPTION OF THE DRAWING

The sole drawing is a schematic diagram of a heating system constructed in accordance with the principles of the present invention.

DESCRIPTION OF THE PREFERRED EMBODIMENT

Referring now to the drawing, there is illustrated one example of the present invention in the form of a heating system 10. The system 10 is adapted to provide heat to the building 12 and includes a conventional forced-air system having a cold-air return 14 which includes a blower 16 used to circulate air through the forced-air system. The system also includes a hot-air duct 20, all of which functions in a conventional manner and needs no further description.

The heating system 10 includes a conventional gas furnace 22 having a combustion chamber 24 within which a fuel, such as gas, is ignited so as to heat the air passing from the cold-air return 14 to the hot-air duct 20 via connecting conduit 26. The gases from the combustion chamber 24 are exhausted from the gas furnace 22 and a flue lock 28 to a conventional metal conduit 30 for communication to the exhaust stack 32 of a chimney 34. It should be noted that the building 12 includes a gas hot-water tank 36 having a combustion chamber for heating hot water within the tank 36 and an exhaust conduit 38 which communicates the burnt gases from the hot-water tank 36 to the exhaust stack 32 of the chimney 34.

The heating system 10 further comprises a heat pump 40 which includes an interior portion or housing 44 that mounts a condenser 46 which, as will be described hereinafter, functions to heat air passing from the cold-air return 14 through the heat pump 40 such that the heated air may be communicated via a second blower 48 to the hot-air duct 20. The heat pump 40 includes a compressor 50 and a 4-way valve 52. The aforementioned components will be described in greater detail hereinafter. The heat pump 40 further comprises a housing 54 which is mounted externally of the building 12 on a concrete slab 55. The housing 54 mounts the compressor 50, the 4-way valve 52 and an evaporator 56 which communicates via suitable fluid conduits and the 4-way valve 52 with the compressor 50 and the condenser 46. The housing 54 further mounts a fan or blower element 62 which is adapted to draw air from the atmosphere through inlet 64 past the evaporator 56 whereupon the air is exhausted through outlet or vent 66. The exhaust stack 32 communicates with an underground duct 68 which, in turn, communicates with the bottom of the external housing 54 such that hot gases from the exhaust stack 32 may be communicated directly to the evaporator 56 and then exhausted into the atmosphere via the exhaust 66. The hot-gas conduit 68 is connected to the evaporator via a vertical conduit 70 which has a lower end connected to a suitable drain such that any water that may collect within the external heat pump housing 54 will be safely drained away.

The system 10, which will be described hereinafter, includes a variety of mechanical and electrical elements that are controlled by a control box 72 which, in turn, is actuated by a conventional thermostat 74.

The hot-air duct 20 includes a movable baffle 76. The baffle 76 is movable between two positions. The first position is the horizontal position "A" illustrated in the sole figure. When the baffle 76 is rotated counterclockwise, as viewed in the drawing, to the position "A", it will engage the conduit 26 to close communication between the gas furnace 22 and the hot-air duct 20, whereby all of the air from the cold-air return 14 will be channeled through the heat pump 40 and to the hot-air duct 20 via the blower 48. In the same manner when the baffle 76 is rotated clockwise, as viewed in the sole figure, to the position "B", the baffle 76 will disengage the outlet side of the furnace 22 whereby the air from the cold-air return 14 will pass through both the furnace 22 and the heat pump 40 and will be communicated to the hot-air duct 20 via conduit 26.

The heat pump 40 includes an evaporator thermometer 80 which is adapted to sense evaporator ambient temperature; and when the evaporator ambient temperature drops below some predetermined level, such as 0 degrees F, the operation of the heat pump 40 will be turned off, as will be described hereinafter.

In use the system 10 is actuated by means of a 3-position thermostat 74 mounted within the usable portion of the building 12. The thermostat 74 is of a conventional type and may be purchased from a variety of suppliers, such as the Honeywell Corporation of Minneapolis, Minnesota. The thermostat 74 includes several thermostat elements which are adapted to actuate the blower 48 and turn on the heat pump 40 when the temperature in the building drops below a first predetermined level. When this occurs, the baffle 76 is rotated counterclockwise to the position "A" to close off communication with the furnace 22 such that the air from the cold-air return 14 travels through the heat pump 40 to the hot-air duct 20 via blower 48. At this time the heat pump 40 is activated such that the fluid heat transfers medium, such as Freon, in the heat pump 40 is evaporated at low pressure in the evaporator 56. The heat for this is drawn from the atmosphere due to the fan 62 drawing air from the outside through the vent 64 past the evaporator 56 prior to exhausting the air back into the atmosphere via vent 66. The work of transporting the Freon from low pressure to high pressure is done by the compressor 50. Thus, the Freon passes through a conduit 60, the 4-way valve 52, to compressor 50, and thereupon is directed to the condenser 46. The compressor 50 draws vapors from the conduit 60 and compresses it to a desired higher pressure. In the condenser 46 the vapor is condensed at that higher pressure and gives off heat in so doing. The air passing by the condenser 46 is heated by the condenser 46. The air is then communicated via blower 48 to the hot-air duct 20 for distribution throughout the building 12. This arrangement of obtaining heat from the atmosphere should function at acceptable levels to provide heat for the building 12 until the temperature outside drops below some predetermined degree, say 32 degrees F. At this point there may not be sufficient heat in the atmosphere for the heat pump to work. Accordingly, heat will not be provided to the interior of the building 12 and a second thermostatic element within the thermostat 74 will be responsive to the continued drop in temperature within the building 12 so as to activate the gas furnace 22 and the blower 16 in the conventional manner. The flue lock 28 is opened and baffle 76 is then shifted to position "B" so as to permit the passage of air through both the furnace 22 and the heat pump 40. The air that is passing through the furnace 22 and past the combustion chamber 24 will be heated thereby and communicated to the hot-air duct 20 via the conduit 26. At the same time the hot gases from the combustion chamber 24 will be communicated to the exhaust stack 32 and due to the vacuum effect generated by the rotating fan 62, the hot gases being exhausted through the conduit 30 into the exhaust stack 32 will be communicated to the conduits 68 and 70 and will pass over the evaporator 56. The heat from the hot gases exhausted from the furnace 22 and the hot-water heater 36 will provide the necessary heat for the heat pump 40 to function. The heat passing over the evaporator 56 will be absorbed thereby and transferred to the condenser 46 in the aforementioned manner, whereupon the air which passes through the heat pump 40 will be heated and communicated to the hot-air duct 20. In certain applications it may be desired that when the gas furnace 22 becomes active, suitable mechanical means connected to the vent 64 will function to close the same so as to provide a strong suction for drawing hot gases from the exhaust stack 32 and communicating the gases to the evaporator via the hot-gas conduits 68 and 70.

When the outside temperature drops below some second predetermined value, say 0 degrees F, the same will be sensed by the thermostat 80 and the heat pump 40 will be turned off, whereupon heat for the building will be provided solely by means of the furnace 20. In this mode the baffle 76 remains in the position "B" and the air passes from the cold-air return 14 through the furnace 22 for communication via conduit 26 to the hot-air duct 20. While each system will have to be experimented with individually to determine the appropriate temperature at which the system should be turned off, it is believed that it is a point at which the temperature is so low that it is simply too inefficient to operate the heat pump.

It should be noted that the heat pump works in the conventional manner in the summertime to provide cooling of the building 12. In the cooling mode the baffle 76 is shifted counterclockwise to the position "A" so as to close off the furnace 22, while the valve 52 functions to direct the flow of the fluid from the condenser 46 to the compressor 50 and onto the evaporator 56. In this mode the condenser 46 functions as an evaporator and the evaporator 56 functions as a condenser, thereby drawing heat from the air passing by the condenser 46, and that heat is exhausted to the atmosphere via the vent 66.

A solar panel 100, adapted to face the sun, has a cold solar air inlet 102 and a solar warmed air outlet 104. A cold solar air manifold 106 extends along a lower edge of the panel and a solar warmed air manifold 108 extends along an upper edge of the panel. A plurality of parallel spaced apart tubes 110 interconnect the manifold 106 and the manifold 108, and as air passes along the tubes 110 it is heated by the sun's ray.

The solar warmed air is pumped by a first pump means 112 to a heat storage means 114. The heat storage means 114 comprises an insulated enclosure 117 containing a plurality of trays 116 containing eutectic salt 118. Eutectic salt 118 has a meeting point of 89° F., and when melting from a solid to a liquid, considerable heat of fusion is absorbed at a constant temperature. Conversely, when the eutectic salt 118, solidifies from a liquid state to the solid state, considerable heat of fusion is given up at a constant temperature. The heat storage means, consequently, is able to store and/or release considerable amounts of heat energy without experiencing a large variation in temperature.

When the heat pump 40 is called upon to deliver heat, a second pump means 120 pumps solar warmed air from the heat storage enclosure 114 via a solar warmed air conduit 115 to a second chamber 57 surrounding the evaporator 56 where the heat of the solar warmed air is drawn by the evaporator 56 and utilized to heat the building 12. The solar warmed air is returned to the heat storage enclosure 114 by a conduit 117 which comprises underground drain tiles surrounding the conduit 117 and serves as a source of heat to add warmth to the air passing therethrough. The ground surrounding the perimeter of the building foundation. A sump pump 119 removes any liquid present in the conduit 117. A conduit 121 interconnecting the conduit 70 and the conduit 117 drains away any liquid that may collect in the conduit 70. The thermostat 74 is programmed so that when there is sufficient solar warmed air to control the temperature of the building 12, the heat pump 40 in conjunction with the solar warmed air is the sole heat source and the gas furnace does not come on.

The enclosure 114 collects and stores solar heat when there is more than sufficient solar radiation to keep the heat pump 40 heating the building 12 efficiently. At night and on cloudy days, when there is a need for heat but little or no solar heat available from the panel 100, enclosure 114 gives up its stored heat to avoid the need for the gas furnace to come on. A temperature sensor 122 measures the temperature of the solar warmed air in the manifold 108 and prevents the first pumping means 112 from pumping solar warmed air into the enclosure 114 when the solar warmed air drops below a predetermined temperature.

It can thus be seen that the present invention has provided a new and improved system for heating buildings and the like wherein a heat pump is used in combination with a gas furnace in such a manner that the system is very economical in that it reclaims the heat which is lost from gas furnaces.

It should be understood by those skilled in the art of heating systems that other forms of applicant's invention may be had, all coming within the spirit of the invention and scope of the appended claims.

Having thus described my invention what I claim is:

1. A heating system for a building comprising:
   a hot-air duct;
   a cold-air return;
   a gas furnace having an inlet communicating with said cold-air return and an outlet communicating with said hot-air duct, said furnace having a combustion chamber for heating the air passing thereby from said cold-air return to said hot-air duct;
   an exhaust stack for exhausting the hot gases from said combustion chamber;
   a heat pump comprising a condenser with an inlet communicating with said cold-air return and an outlet communicating with said hot-air duct, said condenser heating the air passing thereby from said cold-air return to said hot-air duct, said heat pump having an evaporator located externally of said building for drawing heat from the air passing thereby;
   a fan for passing air by said evaporator;
   a first conduit means communicating with the heat stack to a first chamber surrounding said evaporator so that heat from the heat exhausted by said furnace may be drawn from the air via said evaporator and utilized to provide heat for said building, said furnace and said heat pump respectively communicating said cold-air return to said hot-air duct, said hot-air duct having baffle means movable from a first position permitting communication of said furnace and said heat pump with said hot-air duct, to a second position wherein said baffle permits communication from said furnace to said hot-air duct while permitting communication of air through said heat pump to said hot-air duct;
   a solar panel for heating air passed therethrough having a cold air inlet and a solar warmed air outlet; and
   a second conduit means communicating the solar warmed air to a second chamber surrounding said evaporator so that heat from the solar warmed air may be drawn from the solar warmed air via said evaporator and utilized to provide heat for said building.

2. The heating system defined in claim 1 wherein said evaporator is mounted within an enclosed housing externally of said building, said housing having movable baffles for permitting the passage of air thereby, said baffles being closable such that said fan creates a suction for drawing air from said heating stack through said first chamber via said conduit.

3. The heating system defined in claim 1 comprising a thermostat being responsive to a first predetermined temperature for activating said heat pump, said thermostat being operative in response to a second lower temperature for activating said gas furnace.

4. The heating system defined in claim 2 further comprising a thermostat mounted externally of said housing and adapted to terminate operation of said heat pump when the temperature outside said building drops below a predetermined amount.

5. The heating system defined in claim 1 further comprising a heat storage means interposed between the solar panel and said second chamber to store solar heat when there is more solar heat available than needed.

6. The heating system defined in claim 5 further comprising a first pump means to move the solar warmed air from the solar panel to the heat storage means, and a second pump means to move the solar warmed air from the heat storage means to the second chamber.

7. The heating system as defined in claim 5 wherein the heat storage means comprises:
   an insulated enclosure into which the solar warmed air is pumped; and
   a tray of eutectic salt contained in the enclosure, said salt melting to absorb heat and crystalizing to give up heat.

8. The heating system as defined in claim 6 further comprising a temperature sensor to measure the temperature fo the solar warmed air and turn off the first pump means when the solar warmed air temperature is below a predetermined point.

* * * * *

UNITED STATES PATENT AND TRADEMARK OFFICE
CERTIFICATE OF CORRECTION

PATENT NO. : 4,202,493
DATED : May, 13, 1980
INVENTOR(S) : Antonino Franchina

It is certified that error appears in the above-identified patent and that said Letters Patent are hereby corrected as shown below:

Column 5, lines 45 through 48 should read as follows:
-- underground drain tiles surrounding the perimeter of the building foundation. The conduit 117 serves as a source of heat to add warmth to the air passing therethrough. A sump pump 119--.

Signed and Sealed this

Fourth Day of November 1980

[SEAL]

Attest:

SIDNEY A. DIAMOND

Attesting Officer

Commissioner of Patents and Trademarks